Oct. 26, 1926.
G. CHAMPOUX
TIRE RACK AND CHANGER
Filed July 22, 1925
1,604,879
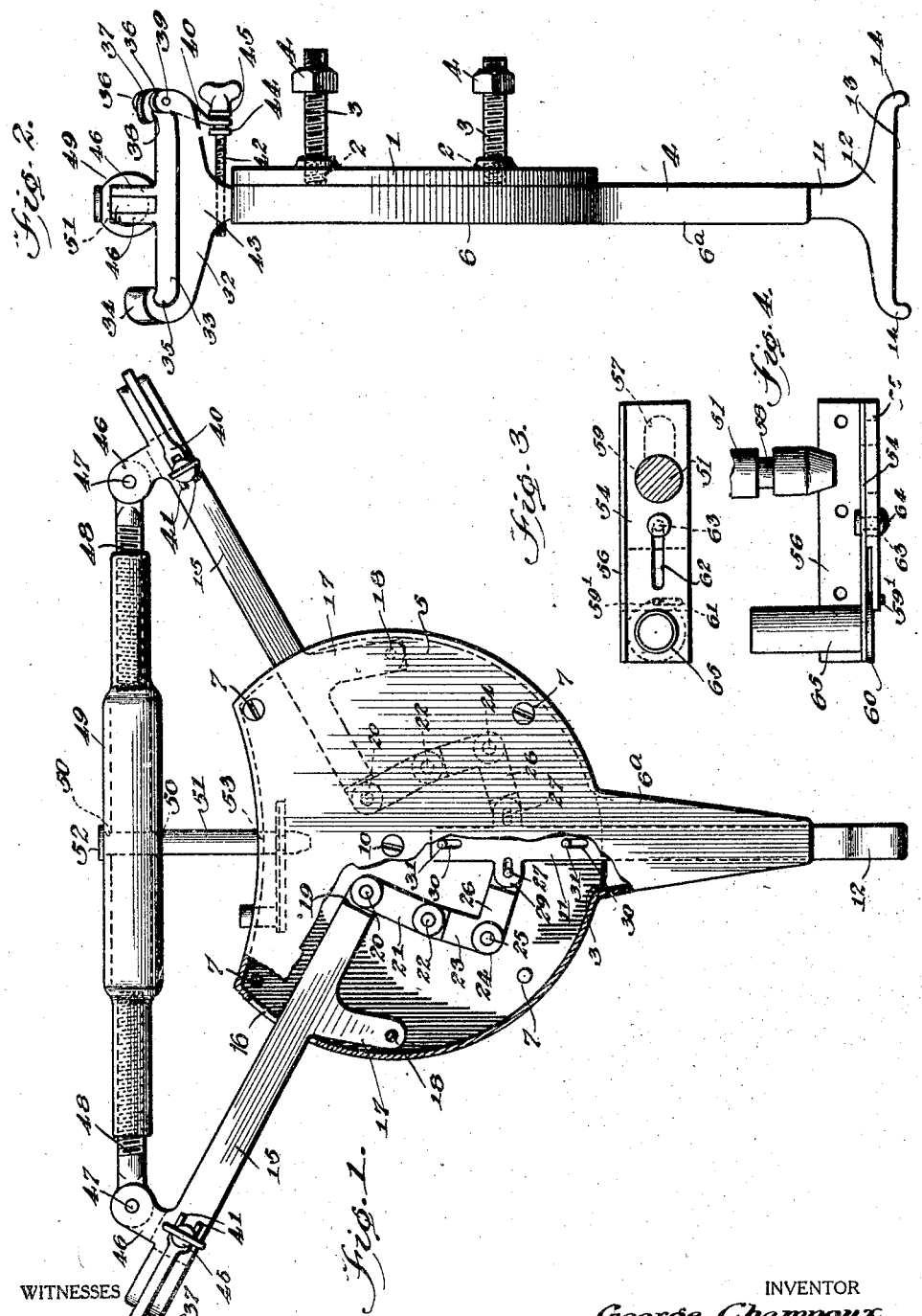
WITNESSES
INVENTOR
George Champoux,
BY
ATTORNEYS Patented Oct. 26, 1926.

1,604,879

UNITED STATES PATENT OFFICE.

GEORGE CHAMPOUX, OF SALMON FALLS, NEW HAMPSHIRE, ASSIGNOR OF ONE-FOURTH TO JOSEPH CAMIRE, ONE-FOURTH TO FREDERICK W. GARDNER, AND ONE-FOURTH TO FREDERICK G. KAESSMANN, ALL OF LAWRENCE, MASSACHUSETTS.

TIRE RACK AND CHANGER.

Application filed July 22, 1925. Serial No. 45,356.

My invention is a tire rack and changer, and it consists in the combinations, constructions and arrangements herein described and claimed.

An object of the invention is the provision of a device having means adjustable to and from position to engage with a tire or a rim on which a tire is mounted, and adapted when in engagement with the tire or rim to support said tire or rim on the device.

A further object of the invention is the provision in a device of the character described, of adjustable means for engaging with a tire supporting rim of the usual split ring type at a plurality of points spaced circumferentially of the tire rim and operable to decrease the effective diameter of the rim so that a tire can be removed from the rim or placed thereon quickly and easily.

A further object of the invention is the provision of a device of the character described having a body attachable to a fixed support and provided with adjustable means for engaging with a rim to releasably hold the rim against displacement from a desirable position with respect to the body, together with locking means for holding the adjustable rim supporting means in rim supporting position, whereby removal of the tire and rim from the device by an unauthorized person is practically prevented.

Other objects and advantages of the invention will be apparent from the following description, considered in conjunction with the accompanying drawings, in which:

Figure 1 is a face view of the improved tire rack and changer in expanded position with a portion of the cover of the body of the device broken away and the body partially shown in section, Figure 2 is an edge view of the structure shown in Figure 1, Figure 3 is a plan view of a bracket for supporting a locking mechanism within the body of the device, Figure 4 is a side elevation of the structure exhibited in Figure 2, together with a fragmentary portion of a pin which can be locked in place by means of said locking mechanism.

The supporting structure of the improved device comprises a case or body which includes an attaching plate 1. The attaching plate 1 has openings 2 threaded for engagement with threaded rods 3 which may be the shanks of bolts, or may be provided with nuts as indicated at 4 for cooperating with the rods to secure the attaching plate to any suitable support, not shown.

The attaching plate is formed with the edge thereof convexly curved for the greater part of its circumference but a portion of the edge of the attaching plate is concavely curved as clearly shown in Figure 1. The casing also comprises a cover plate 5 which conforms in contour substantially to the contour of the attaching plate, and is provided with a depending marginal flange 6 adapted to abut at its edge with the attaching plate and to space the cover plate from the attaching plate. The cover has a radially exending guide extension $6^a$ which is substantially of inverted U-shape in cross section and tapers toward its outer end, as shown. When the cover is attached to the attaching plate, as by means of screws such as indicated at 7, the guide $6^a$ will extend radially outward from the case.

The invention contemplates the provision of a plurality of supporting members or arms arranged to extend radially from the body of the device and having means at their outer ends for engaging with a rim on which a tire is mounted to support the rim and tire in a desirable position with respect to the body of the device, and to releasably hold the tire and rim against displacement from such position. The form of the device illustrated in the drawings has an elongated supporting member 11 of bar like form extending from the space within the body of the device through the guide $6^a$ and being enlarged laterally at its outer end in opposite directions as indicated at 12 to provide a rim engaging head. This rim engaging head has a recess 13 in its outer face having the bottom wall thereof curved to conform substantially to the transverse sectional contour of the inner wall of a rim, not shown, on which an automobile tire, also not shown, may be supported in an ordinary manner. With this arrangement, oppositely inclined retaining projections are produced at the opposite ends of the recess 13, as at 14. The device also includes a pair of similar elongated supporting members 15 of bar like form, which extend from the space within the body through circumferentially extending slots, as at 16. The supporting members 15 lie in planes which diverge from the axial line of the body of the device at an angle of slightly less than 120°, and the respective supporting members 15 are located equi-distant from a vertical plane which extends through the center of the body of the device and also through the longitudinal median line of the guide 6. The respective supporting members 15 have relatively short depending arms 17 which have transverse openings adjacent to their lower ends for the reception of horizontal pivot elements 18. The horizontal pivot elements 18 are fixed in the attaching plate 1 and extend from the latter in the body of the device toward the cover plate 5. The elongated supporting members 15 have transverse shoulders, as at 19 adjacent to their inner ends, and are pivotally attached by horizontal pivot elements as at 20 to the outer end portions of links 21 which are disposed within the body of the device, and are attached at their inner ends by horizontal pivot elements at 22 to end portions of arms 23 of bell crank levers 24 which are fulcrumed on horizontal pivot elements 25. The pins 25 are fixed in the attaching plate 1 and the other arms of the bellcranks extend from their junctures with the arms 23 toward each other and toward a vertical plane which extends through the center of the body of the device, such other arms of the bell cranks being indicated at 26. These arms 26 of the bell cranks have horizontal pins 27 extending outwardly therefrom, or in other words, toward the cover plate 5. These pins 27 engage with alined slots 28 in arms 29 which are rigid with the supporting bar 11 and extend in opposite directions from the inner end portion of the latter. The bar 11 is formed with alined slots 30 which are spaced longitudinally of the bar. Guide pins 31 are fixed in the attaching plate 1, and extend from the latter and work in the slots 30, thereby limiting the extent of longitudinal movement of the bar 11 and cooperating with the hereinbefore mentioned parts.

The supporting bars 15 also are enlarged laterally at their outer ends as at 32 to provide rim engaging heads, each of which has a recess in its outer face as indicated at 33 conforming substantially in longitudinal sectional contour to the cross sectional contour of the tire supporting rim. It is to be observed that one end wall of the recessed portion 33 of each head 32 curves radially outward and laterally inward as indicated at 34, thus defining a lug having a socket or groove 35 at one end of the recess 33 for the reception of the usual flange at an edge of a tire supporting rim. The end wall at the opposite end of the recess 33 extends radially outward from the supporting head 2 and is bifurcated by a slot which extends in the direction of length of the recess 33, thus producing a pair of spaced ears 36 at one end of the recess at 33. A locking lug 37 having the outer end portion thereof curved laterally inward to define a groove or socket 38 for engagement with the flange at the opposite edge of the usual tire supporting rim, is supported between the ears 36, as at 39, and has a handle portion 40. The handle portion 40 has forks as indicated at 41. An adjusting screw 42 is engaged with a threaded opening 43 which extends transversely through the outer end portion of the associated supporting member 15. The adjusting screw extends between the forks 41 which straddle the adjusting screw between collars 44 and 45, respectively.

The supporting members 15 are provided adjacent to their outer ends with attaching ears 46 which extend from the adjacent sides of the members 15, and are pivotally attached by horizontal pivot elements 47 to the outer ends of a pair of threaded rods 48. The threaded rods 48 are adjustably connected by a coupling sleeve or turn buckle 49. The latter is provided with diametrically opposite longitudinally extending transverse slots or openings 50 through which the shank 51 of a headed locking pin may extend. The width of the slots 50 is less than the diameter of the head 52 of the locking pin.

The inner end portion of the locking pin 51 extends through a slot 53 in the concavely curved portion of the flange 6, and through vertically alined apertures in a shelf 54 and a latch plate 55. The shelf 54 may be a horizontal portion of a bracket having an attaching portion 56 secured to the attaching plate 1. The aperture in the latch plate 55 has a narrow outer end portion 57 of less width than the diameter of the shank of the pin 51, but of slightly greater width than the diameter of a short reduced portion 58 of the shank of the locking pin, this reduced portion of course having shoulders at its upper and lower ends and thus defining an annular groove which completely encircles the locking pin. The aperture in the latching plate 55 also includes a relatively wide portion 59 at the inner end of the portion 57, and of slightly greater diameter than the body of the shank of the locking pin. Therefore, when the shank of the pin 51 has been projected through the vertically alined slots 50 in the coupling sleeve 49, through the vertical opening in the concavely curved portion of the flange 6, and through the vertical aperture in the shelf 54 and the relatively wide portion 59 of the aperture in the latching plate 55, such locking pin can be held against displacement by shifting the latching plate 55 longitudinally until the reduced portion 58 of the locking pin enters the narrow portion 57 of the vertical aperture of the latching plate. This movement of the latching plate 55 can be effected by an operating mechanism which includes a wrist or eccentric pin 59′ depending from a disk 60 through a slot 61 in the adjacent end portion of the latching plate 55. The latching plate 55 has a slot, as at 62, through which a guide pin 63 loosely extends, the guide pin 63 being carried by the shelf 54 and being upset at its inner end as at 64 to prevent flatwise movement of the latching plate 55 from position against the shelf 54. The disk 60 is controlled by the usual mechanism of a cylinder lock, which is shown more or less diagrammatically at 65, since it is of ordinary construction, and is adapted to be operated by a suitable key in such manner as to effect rotation of the disk 60. Rotation of the disk 60 of course will cause the movement of the latching plate 55 in a direction which is in the general direction of length of the latching plate, and the latching plate can thus be shifted longitudinally to and from position to secure the locking pin 51 against upward movement from the position shown in Figure 1.

From the foregoing description of the various parts of the device, the operation thereof may be readily understood. In use, the device probably will be inverted from the position shown in Figs. 1 and 2 so that the arms 15 will extend at the lower side of the body of the device and the arm 11 will extend at the upper side of the body of the device although obviously, the device may be used in the position shown in Figs. 1 and 2 or turned about the axis of the plate 1 to any other desired position. The coupling sleeve or turn buckle 49 cannot be turned to draw the respective supporting members 15 toward each other, or to move these supporting members apart so long as the locking pin 51 is held against displacement from the position shown in Figure 1. Therefore, theft of a tire which is carried by the device is practically prevented and cannot be accomplished without breaking of the device when a rim with the tire thereon has been placed in position to be supported by the rim engaging heads of the respective supporting members 15 and 11, and such supporting members have been adjusted to cause engagement of the rim engaging heads of the supporting members with the rim thereon. The rim will be held against axial movement from position on the heads of the members 15 and 11, when the adjusting screws 42 have been manipulated to swing the upper end portions of the latching members 37 to position to cooperate with the lugs 34 to grip the portion of the rim that is disposed between the lugs 34 and 37. This arrangement permits use of the device as a tire changer when used in conjunction with a rim of the usual split ring type of construction. The ends of a rim of that type are lapped when the rim is in contracted or inoperative position and it then is necessary to expand the rim with a tire thereon until the ends of the rim abut each other, at which time the tire will fit tightly on the rim. The expansion of the rim to mount a tire on the latter can be quickly and easily accomplished by placing the contracted rim (with the tire loosely thereon) on the contracted device with the heads of the members 11 and 15 bearing against the inner wall of the rim. The device then is expanded by manipulation of the turnbuckle until the ends of the rim abut each other and the expanded rim fits tightly in the tire.

To remove a tire from a split rim, the fastening means on the heads of the members 15 are engaged with the rim so that the head of one of the members 15 is engaged with an end portion of rim nearer to the joint between the ends of the rim than the head portion of the other member 15, the device being in expanded position with the head of the member 11 bearing against the inner wall of the rim. The device then is contracted by manipulating the turnbuckle and the end portion of the rim with which said one member 15 is connected will be drawn inward to a greater extent and more positively than the extremity of the other end portion of the rim until the joint between the end portions of the rim is broken and the end portions of the rim then will move to lapped position and the rim will be contracted, permitting easy removal of the tire.

Obviously, the invention is susceptible of embodiment in forms other than that which is illustrated in the accompanying drawings, and I therefore consider as my own all such modifications and adaptations thereof as fairly fall within the scope of the appended claims.

For example, the arms 15 may be adjustable as to length.

I claim:

1. A device of the character described, comprising a plate attachable to a fixed support, a plurality of outwardly divergent arms movably supported adjacent to their inner ends on said plate, motion transmission means connecting the inner end portions of said arms whereby all said arms will move simultaneously outward and simultaneously inward with respect to the axial line of the plate, and means for actuating said arms, one of said arms being movable longitudinally toward and away from the axial line of said plate and the remaining arms being swingable in the plane of said first named arm, about axes eccentric to said plate.

2. A device of the character described, comprising a body having an attaching plate, a plurality of spaced outwardly divergent arms, one of said arms having spaced longitudinally extending guide slots, pins on said attaching plate working in said guide slots, the remaining arms having lateral extensions pivotally attached to said attaching plate, whereby said one arm is movable longitudinally and the remaining arms are swingable outward and inward on the attaching plate in the plane of said first named arm, lever and link devices connecting the inner ends of said swingable arms to said longitudinally shiftable arm, whereby all of said arms will move outward and inward in unison, and means for operating said arms.

3. A device of the character described, comprising a body having an attaching plate, a plurality of spaced outwardly divergent arms, one of said arms having spaced longitudinally extending guide slots, pins on said attaching plate working in said guide slots, the remaining arms having lateral extensions pivotally attached to said attaching plate, whereby said one arm is movable longitudinally and the remaining arms are swingable outward and inward on the attaching plate in the plane of said first named arm, lever and link devices connecting the inner ends of said swingable arms to said longitudinally shiftable arm, whereby all of said arms will move outward and inward in unison, means for operating said arms, and means for locking said operating means in adjusted position.

4. A device of the character described, comprising a body having an attaching plate, a plurality of spaced outwardly divergent arms, one of said arms having spaced longitudinally extending guide slots, pins on said attaching plate working in said guide slots, the remaining arms having lateral extensions pivotally attached to said attaching plate, whereby said one arm is movable longitudinally and the remaining arms are swingable outward and inward on the attaching plate in the plane of said first named arm, lever and link devices connecting the inner ends of said swingable arms to said longitudinal shiftable arm, whereby all of said arms will move outward and inward in unison, means for operating said arms, and a cover attachable to said attaching plate and having a flange adapted to bear against said attaching plate, said flange having a guide extension to which said longitudinally shiftable arm extends and having slots to which said swingable arms extend.

5. A device of the character described, comprising an attaching plate, a pair of arms having lateral attaching portions adjacent to their inner ends pivotally attached to said attaching plate, a third arm supported adjacent to its inner end on said attaching plate to move longitudinally in the plane of said swingable arms and along a line midway between said swingable arms, a pair of threaded rods pivotally attached at their outer ends to the respective swingable arms, a coupling nut connecting said rods, motion transmission means connecting the inner ends of said swingable arms with said longitudinally movable arms, whereby said arms will all be moved inward and outward in unison when said coupling nut is turned, and means for locking said coupling nut to said attaching plate to prevent turning of said coupling nut.

6. A device of the character described, comprising an attaching plate, a pair of arms having lateral attaching portions adjacent to their inner ends pivotally attached to said attaching plate, a third arm supported adjacent to its inner end on said attaching plate to move longitudinally in the plane of said swingable arms and along a line midway between said swingable arms, a pair of threaded rods pivotally attached at their outer ends to the respective swingable arms, a coupling nut connecting said rods, motion transmission means connecting the inner ends of said swingable arms with said longitudinally movable arms, whereby said arms will all be moved inward and outward in unison when said coupling nut is turned, said coupling nut having alined slots extending through the middle portion thereof between the ends of said threaded rods, a pin insertable through slots and extending adjacent to said attaching plate, and a locking mechanism carried by said attaching plate for locking said pin against movement relatively to said attaching plate.

7. A device of the character described comprising a supporting plate, an arm mounted on the plate for longitudinal movement toward and away from the axial line of the plate, a pair of outwardly divergent arms pivotally supported on the plate to swing about axes equi-distant from the axial line of and eccentric to said plate, all of said arms extending beyond the edge of the plate and said divergent second named arms extending from the plate at the side of the latter opposite to said first named arm, and means connecting the inner ends of all of said arms so that all of said arms will move simultaneously outward and simultaneously inward with respect to the axial line of said plate.

GEORGE CHAMPOUX.